Oct. 31, 1933.                J. L. SWEZEY                1,932,428
                        PRESSURE SIGNALING INDICATOR
                         Filed Feb. 23, 1929       2 Sheets-Sheet 1
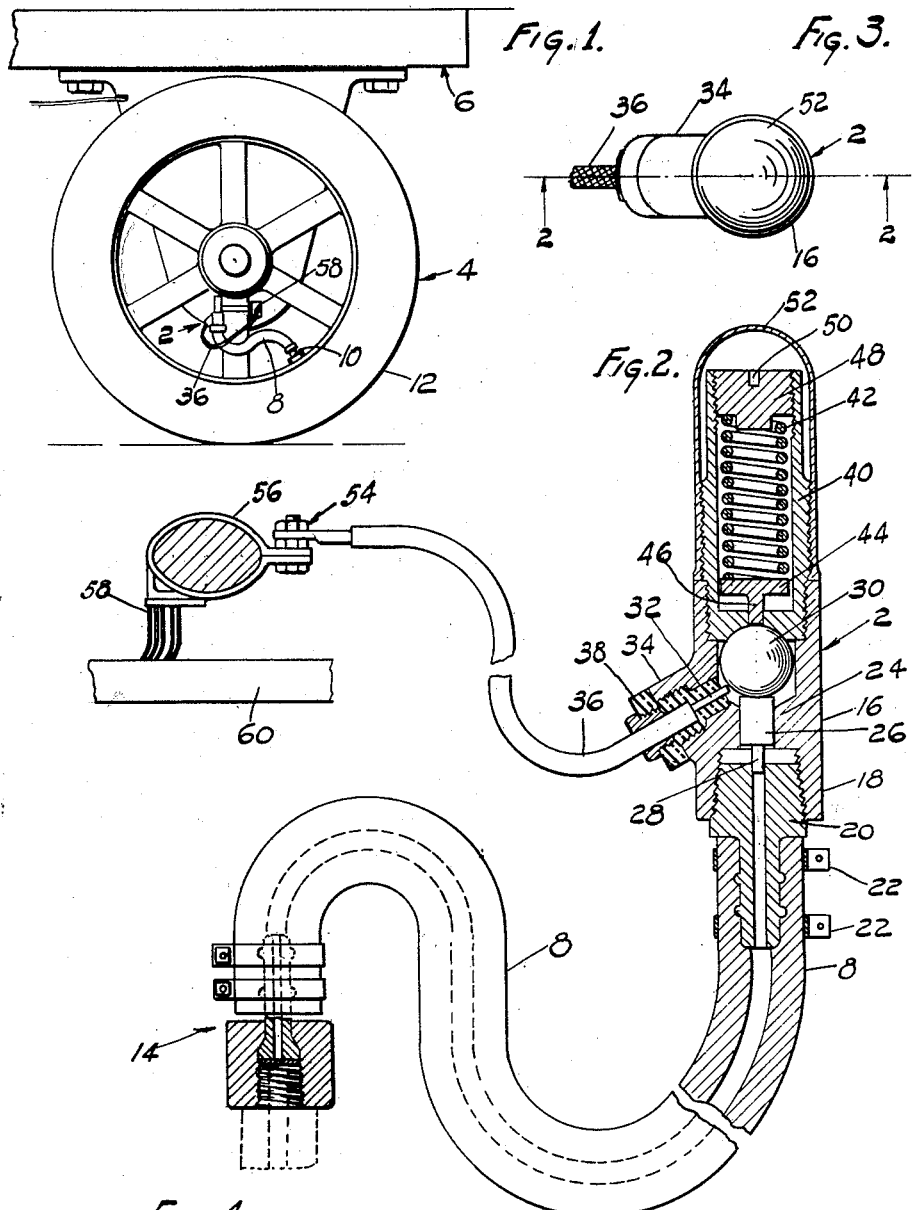
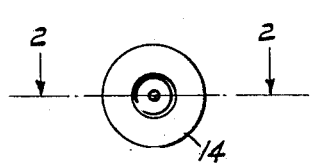
Inventor
JOEL L. SWEZEY.
By Fred H Hayn
                Attorney Oct. 31, 1933.   J. L. SWEZEY   1,932,428
PRESSURE SIGNALING INDICATOR
Filed Feb. 23, 1929   2 Sheets-Sheet 2
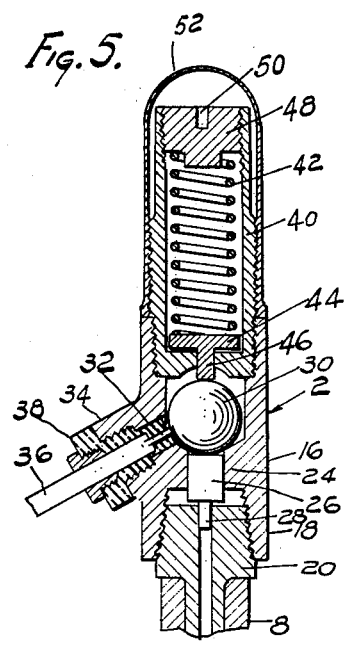
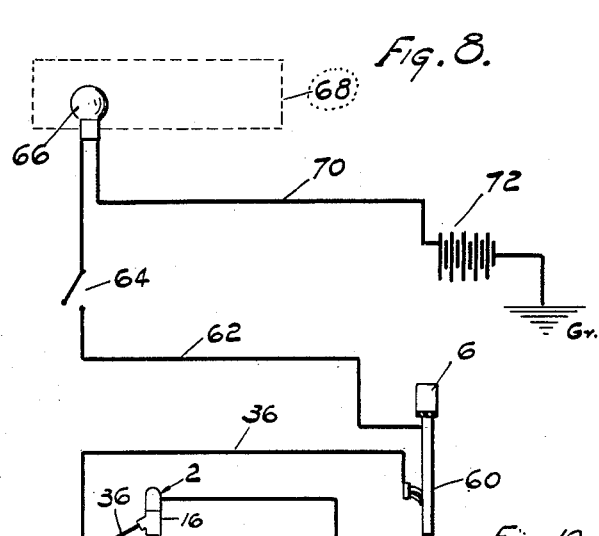
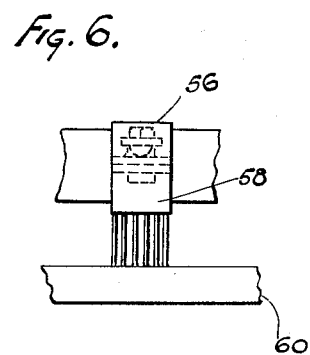
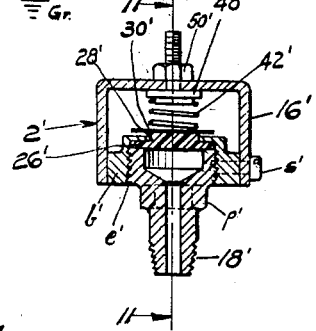
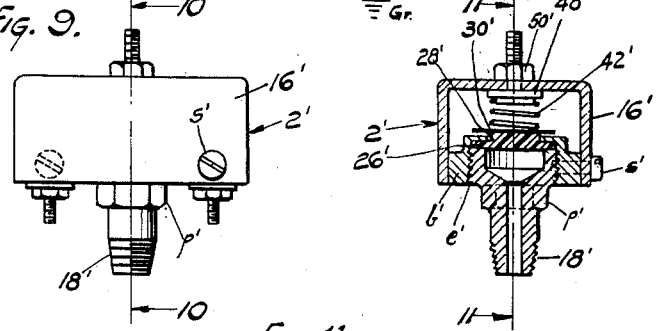
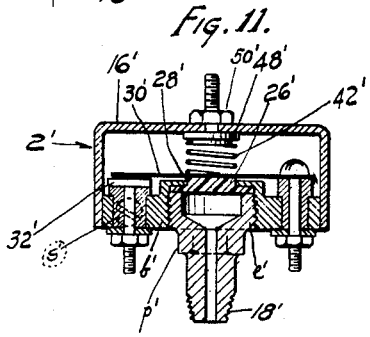
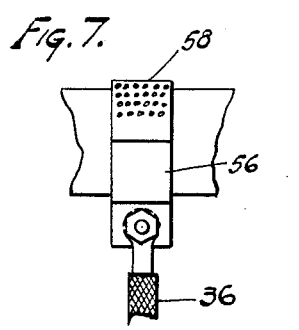
Inventor
JOEL L. SWEZEY.
By Fred D. Hayn
Attorney Patented Oct. 31, 1933

1,932,428

UNITED STATES PATENT OFFICE 1,932,428

PRESSURE SIGNALING INDICATOR

Joel L. Swezey, Compton, Calif., assignor to Pneumatic Indicator Company, a corporation Application February 23, 1929
Serial No. 341,923

2 Claims. (Cl. 200—58)

My invention relates to pressure signaling indicators and more particularly to such indicators adapted to be associated with the valve casings of motor vehicle tires to indicate a drop of pressure therein, but in its broader aspects is not to be limited to such, said invention being adaptable for a wide variety of uses.

It accordingly is an object of my invention to provide a novel form of pressure signaling indicator adapted to be subjected to fluctuating pressures, which pressures are communicated to a movable device of any preferred material, either flexible or rigid, which device is adapted to move a movable electrode of any desired form, which electrode is adapted to make contact with a stationary electrode when a preferably predetermined pressure drop has been reached, means, preferably of a resilient character, being provided for adjusting the distance moved by said movable electrode.

It is also within the province of my invention to provide a novel form of pressure signaling indicator mechanism, adapted for special use in connection with motor vehicles in which any preferred form of pressure signaling indicator device, in circuit with a source of electrical energy, such as the battery of said vehicle, said device being also in circuit with one or more electrical signaling means such as lamps or bells, positioned anywhere on said vehicle, said device and said signaling means being also in circuit with a movable means, such as a brush adapted to be associated in any preferred manner with the wheels of the vehicle, said means being adapted periodically to establish electrical connection between said signaling means and said pressure indicator when a predetermined pressure drop in said tires has been indicated.

The above and further objects and advantages of my invention, as will hereinafter more fully appear, I attain by the mechanism described in the specification and illustrated on the drawings, forming a part of my application.

Reference is had to the accompanying drawings, in which similar reference characters denote similar parts. In the drawings, Fig. 1 is a fragmentary side elevational view of a motor vehicle, illustrating one application of my invention to the tires of said vehicle, Fig. 2 is an enlarged fragmentary sectional view of one form of pressure signaling indicator device, illustrating a suggestive way of connecting same to the tire valve casing, and showing also the brush or movable means for periodically establishing the electric circuit, attached to the vehicle wheel, the electrodes being also out of contact, Fig. 3 is a top plan view of the indicator depicted in Fig. 2, Fig. 4 is a bottom plan view of the valve casing attachment shown in Fig. 2, Fig. 5 is a vertical sectional view of the indicator shown in Fig. 2 showing the electrodes in contact, Fig. 6 is a fragmentary top plan view of the brush or movable contact means contacting with a stationary part of the vehicle, Fig. 7 is a side elevational view of Fig. 6, Fig. 8 is a diagrammatic view of the electrical circuits, Fig. 9 is an elevational view of a modified form of indicator, which may in practice be preferred, Fig. 10 is a vertical cross-sectional view, taken on the line 10—10, Fig. 9, looking in the direction of the arrows, and Fig. 11 is a similar view, taken on the line 11—11, Fig. 10.

Describing my invention more in detail, in its broader aspects said invention comprises a pressure signaling indicator device of any preferred form adapted for special use in connection with the valve casings of motor vehicles, especially of the truck type where it is almost impossible, due to the noise of travel, to tell when a tire is flat or needs air, said indicator comprising any preferred form of casing associated with said tires in any desired manner, or with fluctuating pressure conditions.

A movable member of any preferred material, either flexible or rigid, may be subjected to fluctuating fluid pressure conditions, said member being adapted to actuate a movable electrode to make contact with a stationary electrode, the electric circuit being adapted to be periodically established by means of a movable device such as a brush, which may be associated with the wheel of the vehicle, if desired, to close the circuit with a source of electrical energy, such as the battery of the vehicle through a stationary part of the vehicle, a set of signals, one for each wheel, such as lamps or bells, being adapted to indicate instantly to the driver of the vehicle just which wheel has a flat tire.

More specifically, my invention comprises a signaling indicator switch device, designated generally by the numeral 2, which may be positioned on the wheel 4 of the vehicle 6, as seen in Fig. 1, said device having a flexible or other connection 8 leading to the valve casing 10 of the tire 12, a conventional socket and clamp 14 being provided for this purpose. See Figs. 2 and 4. The tire valve in this form is, of course, removed so that the pressure conditions therein will be communicated directly to the device 2.

The signaling indicator depicted in Figs. 1, 2, 3 and 5 comprises a casing 16 having an internally threaded socket connection 18 adapted to be screwed onto the screw threaded male member 20 so secured to the tube or connection 8, secured therein by the clamps 22 (Fig. 2). It will, of course, be understood, that other connecting means may be substituted for that just described.

The casing 16 is provided with a ledge 24, in which in this instance is adapted to be reciprocated a rigid pressure actuated device 26, the reduced end 28 of which is subjected to the pressure conditions in the connection 8 and tire 12. Positioned within the casing 16, and above the device 26, is a movable electrode 30 adapted to establish electrical connection with the stationary electrode 32 positioned in the projection 34 of the casing 16 through which the electrical lead 36 extends, suitable screw-threaded insulating means 38 being provided for securing said lead and electrode in position, the casing 16 being grounded.

The casing 16 has a suitable upper elongated hollow plug 40 adapted to house a suitable resilient means which may take the form of a helical spring 42 adapted to abut against a reciprocating device 44 having its reduced end 46 projecting through the lower part of the plug 40 to engage the mobile device 30 and resist its movement by reason of the spring 42, the upper end of said spring engaging an adjustable plug closure 48, screw-threaded into the plug 40, a kerf 50 providing means for adjustment by being engaged with a suitable implement such as a screw driver. A screw threaded dust cap 52 is screwed over the plug 40 to exclude dust. See Figs. 2 and 5.

Fig. 5 shows the position of the parts when electrical contact is established, and Fig. 2 shows the electrodes disconnected. When the pressure drops in the tire 12, the pressure of the spring 42 causes the device 44 to force the ball 30 to contact the stationary electrode 32, the device 26 having, of course, dropped, due to the drop in pressure. By adjusting the plug 48, a predetermined pressure drop may be indicated to a nicety.

The lead 36 is provided with a suitable terminal 54 connected to the clamp 56 which has associated therewith in any preferred manner the movable means 58 in the shape of a brush constructed of material of electrical conductivity, to make periodic contact with the plate 60 as the wheel 4 is rotated, which plate may be positioned on the vehicle 6 at any convenient place, said plate being insulated therefrom. The clamp 56 may be positioned on one of the spokes of the wheel 4, although this is not essential.

As seen in Fig. 8, the electric circuit is established through the lead 36, the indicator 2 being grounded, as shown, said lead connecting the brush 58 to the insulated plate 60, a wire 62 connecting said plate to a suitable cut out switch 64, connected to the signal or signals 66 in the indicating box 68, positioned anywhere on the vehicle 6 within convenient visibility or hearing of the operator, the wire 70 leading to a source of electrical energy, such as the battery 72, which is grounded as indicated.

The modification depicted in Figs. 9–11 inclusive may be preferable in practice by reason of its simplicity, ease of construction and inexpensive manufacture. In this form of my invention the screw-threaded portion 18' may be screwed into a suitable valved connector associated in any preferred manner with the valve casing of the tire, so air may be introduced into said tire at any time, without interfering with the indicator 2'.

The indicator 2' comprises a dust excluding casing 16' slipped over a base b', and secured thereto by suitable fastening means such as the screws s', and screwed into said base is the portion 18' having an upper screw threaded cup shaped end e', and positioned in the hollow portion of said end e' is a suitable pressure operated device 26', which may be made of flexible material such as rubber, adapted to engage and actuate the device 28', which in turn moves the movable electrode 30', which may be made of a flat resilient spring of electrical conductivity. As in the other form of my invention, a suitable pressure spring 42', abutting against the electrode 30' below and against the adjustable device 48', adjusted by the nut 50'.

The device 18' is provided with a part p' for engagement with a suitable implement such as a wrench. The removable electrode 30' is anchored at one end, and insulated from the casing 16', as indicated in Fig. 11, and has its free end adapted to engage with the stationary electrode 32' also insulated from said casing, which casing is grounded, as in the other form of my invention, the electric circuits being also precisely the same.

While I have thus described my invention with great particularity, it is clear that my apparatus may be modified throughout a wide range. I therefore do not propose to limit myself to the exact details of construction shown and described, but reserve the right in practice to make any and all modifications thereof that fall within the scope of the appended claims.

I claim as my invention:

1. In a device of the class described, a hollow plug adapted to be detachably connected to a tire valve casing, a base detachably connected to said plug, a casing detachably connected to said base, a stationary electrode detachably connected to said base, and positioned at one end thereof, a leaf spring movable electrode detachably connected to the other end of said base, the free end of said spring being normally out of contact with said stationary electrode, an insulating movable member, responsive directly to the pressures in said tire, and adapted to actuate said movable electrode, and means abutting the top of said casing and said movable electrode, whereby said movable electrode will respond to the fluctuating pressures in said tire.

2. In a device of the class described, a casing, a base for said casing, a stationary electrode positioned in said base, a spring electrode positioned on said base, a resilient insulating member movable in said casing upon which said movable electrode is positioned, means for opposing the movement of said member as it responds to the fluctuating pressures in said tire, and a hollow member detachably connected to said base and adapted to securely hold the outer portion of said insulating member in secured and detachable relation with said base.

JOEL L. SWEZEY.